Figure 3:
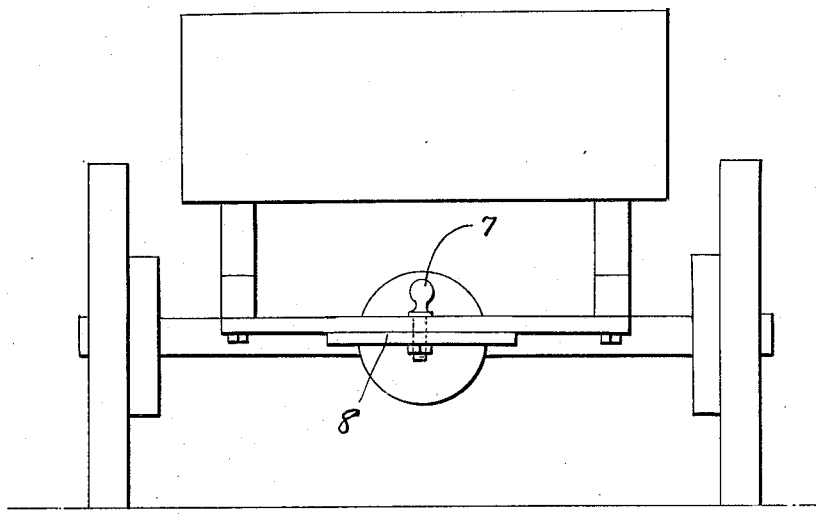

June 16, 1931. J. BILLSTEIN 1,810,592
TRAILER HITCH
Filed May 9, 1930  2 Sheets-Sheet 1
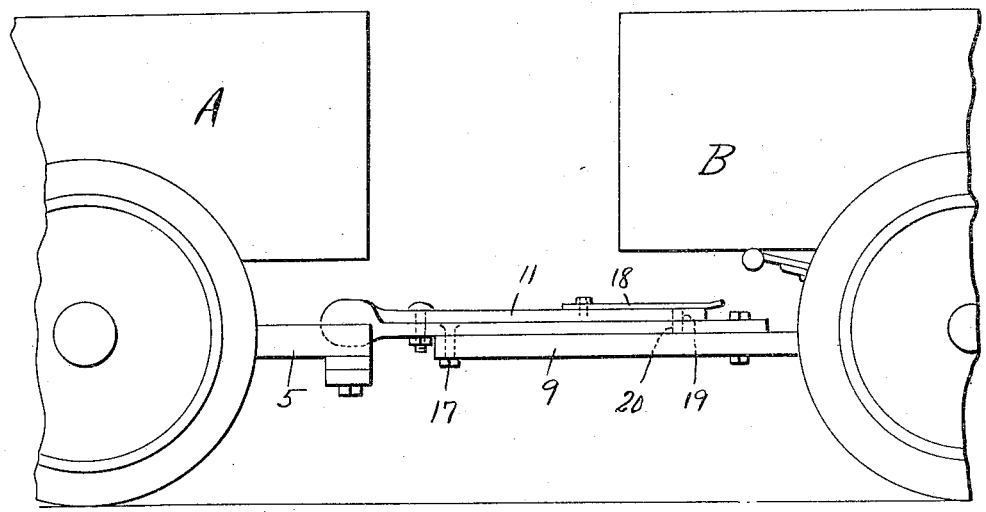
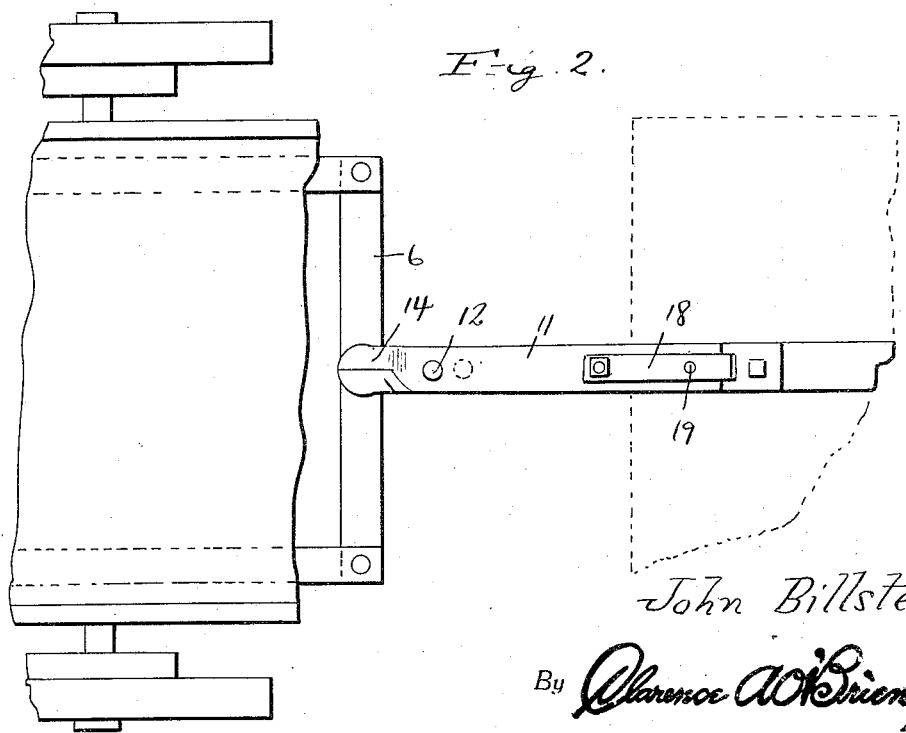
Inventor
John Billstein
By Clarence A. O'Brien
Attorney June 16, 1931.     J. BILLSTEIN     1,810,592
TRAILER HITCH
Filed May 9, 1930     2 Sheets-Sheet 2

Inventor

John Billstein

By Clarence A. O'Brien
Attorney

Patented June 16, 1931

1,810,592

UNITED STATES PATENT OFFICE

JOHN BILLSTEIN, OF LITTLE FALLS, MINNESOTA

TRAILER HITCH

Application filed May 9, 1930. Serial No. 451,079.

The present invention relates to a trailer hitch and has for its object to provide a hitch of this nature which is easy to engage with the towing vehicle and easy to disengage therefrom.

A still further very important object of the invention resides in the provision of a trailer hitch of this nature which is exceedingly simple in its construction, inexpensive to manufacture, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 4:
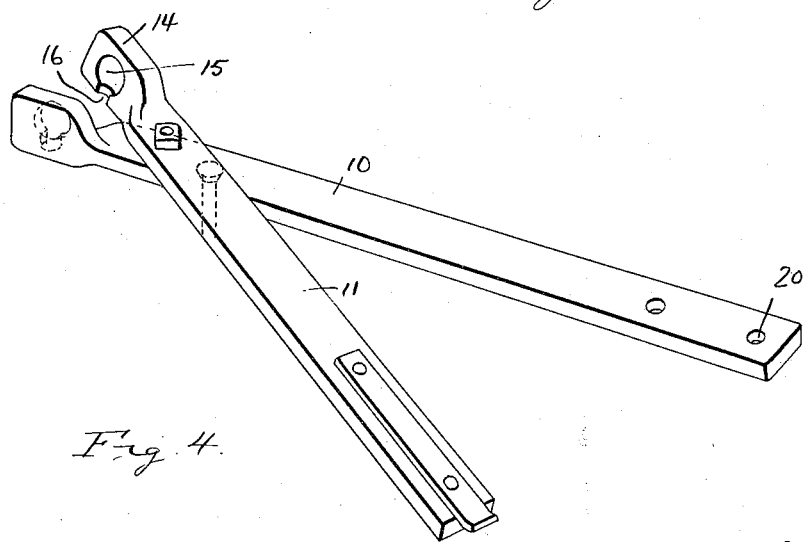

In the drawings:

Figure 1 is a side elevation of the hitch embodying the features of my invention showing the same in view, Figure 2 is a top plan view thereof, Figure 3 is a rear elevation of the towing vehicle, and Figure 4 is a perspective view of the hitch.

Referring to the drawings in detail it will be seen that the letter A denotes the towing vehicle and the letter B the towed vehicle. Numeral 5 denotes side members of the frame of the towing vehicle A and across the rear ends of the frame side 5 is a bar 6. A ball 7 is formed on a bolt 8 which projects through the center of the cross bar 6 so that the head or ball 7 rises therefrom.

The numeral 9 denotes the tongue or draw bar of the towed vehicle B. Numerals 10 and 11 denote a pair of bars pivoted together as at 12 in proximity to adjacent ends thereof. Said adjacent ends are formed with plates 14 adapted to abut each other when the bar 11 is disposed on top of the bar 10 and the abutting faces of these plates 14 are formed with socket recesses 15 with necks 16 at the bottom thereof for the purpose of receiving the ball 7 thereby providing a ball and socket joint between the hitch and the cross bar 6.

The bar 10 is bolted as at 17 on top of the draw bar 9. A spring 18 is mounted on the bar 11 and has a pin 19 receivable in an opening 20 in the bar 10 so as to hold the hitch in its engaged position. To disengage the hitch it is only necessary to lift up the spring so as to move the pin 19 from the opening 20 and then the bar 11 may be swung at an angle to the bar 10 which causes the separating of the plates 14 and freeing the ball 7 as will be quite apparent.

It is thought that the construction, operation, utility and advantages of this invention will now be quite apparent to those skilled in this art without a more detailed description thereof.

The present embodiment of the invention has been disclosed in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of is advantages.

Having thus described my invention, what I claim as new is:

In a trailer hitch of the class described, a ball, means for attaching the ball to a towing vehicle, a pair of bars, means pivotally connecting the bars together in proximity to adjacent ends thereof, said adjacent ends being formed with plates adapted to abut each other when the bars are superimposed, the opposed faces of the plates being formed with recesses to receive the ball, one of said bars being provided with means whereby it may be attached on top of a draw bar of a towed vehicle.

In testimony whereof I affix my signature.

JOHN BILLSTEIN.